(12) United States Patent
Miyairi et al.

(10) Patent No.: US 7,771,673 B2
(45) Date of Patent: *Aug. 10, 2010

(54) PLASMA GENERATING ELECTRODE AND PLASMA REACTOR

(75) Inventors: Yukio Miyairi, Nagoya (JP); Yasumasa Fujioka, Nagoya (JP); Masaaki Masuda, Nagoya (JP); Takeshi Sakuma, Nagoya (JP); Tatsuhiko Hatano, Kasugai (JP); Yoshihiro Sato, Nisshin (JP); Junichi Suzuki, Kuwana (JP)

(73) Assignees: NGK Insulators, Ltd., Nagoya (JP); Honda Motor Co., Ltd., Tokyo (JP)

( * ) Notice: Subject to any disclaimer, the term of this patent is extended or adjusted under 35 U.S.C. 154(b) by 1265 days.

This patent is subject to a terminal disclaimer.

(21) Appl. No.: 10/561,841

(22) PCT Filed: Jun. 25, 2004

(86) PCT No.: PCT/JP2004/009014
§ 371 (c)(1),
(2), (4) Date: Dec. 22, 2005

(87) PCT Pub. No.: WO2005/001250
PCT Pub. Date: Jan. 6, 2005

(65) Prior Publication Data
US 2006/0153750 A1  Jul. 13, 2006

(30) Foreign Application Priority Data
Jun. 27, 2003 (JP) .............................. 2003-184092
Oct. 30, 2003 (JP) .............................. 2003-369886

(51) Int. Cl.
*B01J 19/08* (2006.01)
(52) U.S. Cl. .............................................. 422/186.06
(58) Field of Classification Search ............. 422/186.06
See application file for complete search history.

(56) References Cited

U.S. PATENT DOCUMENTS

| 6,821,493 | B2 * | 11/2004 | Nelson et al. .......... 422/186.04 |
| 6,979,892 | B2 * | 12/2005 | Li et al. ...................... 257/682 |
| 2002/0174938 | A1 | 11/2002 | Xiaobin Li et al. |

FOREIGN PATENT DOCUMENTS

JP      A 2001-164925     6/2001

OTHER PUBLICATIONS

U.S. Appl. No. 10/561,840, filed Dec. 22, 2005, Miyairi et al.
U.S. Appl. No. 10/562,597, filed Dec. 21, 2005, Miyairi et al.
U.S. Appl. No. 10/562,467, filed Dec. 27, 2005, Miyairi et al.

* cited by examiner

*Primary Examiner*—Kishor Mayekar
(74) *Attorney, Agent, or Firm*—Oliff & Berridge, PLC (57) ABSTRACT

A plasma generating electrode of the present invention includes a pair of unit electrodes 2, each of the pair of unit electrodes 2 including a plate-like ceramic body 19 and a conductive film 12 disposed inside the ceramic body 19 and including a plurality of protrusions 13 on a front surface, the pair of unit electrodes 2 constituting a basic unit 1 by being hierarchically layered at intervals corresponding to thickness of the protrusion 13 in a state that a plurality of spaces which are open on each end in the arrangement direction of the protrusion are formed, the basic units 1 constituting an electrode unit in which the basic units 1 are hierarchically layered at intervals corresponding to the thickness of the protrusion 13, and the plasma generating electrode being capable of generating plasma in the three-dimensionally arranged spaces V upon application of voltage between the unit electrodes 2 constituting the electrode unit. Therefore, the plasma generating electrode is capable of generating uniform and stable plasma and exhibiting excellent heat resistance.

13 Claims, 6 Drawing Sheets

PLASMA GENERATING ELECTRODE AND PLASMA REACTOR

CROSS-REFERENCE TO RELATED APPLICATIONS

This application claims priority benefit of PCT Application No. PCT/JP04/009014, entitled "Plasma Generating Electrode and Plasma Reactor," by Yukio Miyairi, Yasumasa Fujioka, Masaaki Masuda, Takeshi Sakuma, Tatsuhiko Hatano, Yoshihiro Sato, and Junichi Suzuki, filed Jun. 25, 2004, which is based on Japanese Application No. 2003-184092, filed on Jun. 27, 2003 and Japanese Application No. 2003-369886, filed on Oct. 30, 2003. All of the above applications are incorporated herein by reference.

TECHNICAL FIELD

The present invention relates to a plasma generating electrode and a plasma reactor. More particularly, the present invention relates to a plasma generating electrode and a plasma reactor capable of generating uniform and stable plasma and exhibiting excellent heat resistance.

BACKGROUND ART

It is known that silent discharge occurs upon disposing a dielectric between two electrodes and applying a high alternating current voltage or a periodic pulsed voltage between the electrodes. In the resulting plasma field, active species, radicals, and ions are produced to promote a reaction and decomposition of gas. This phenomenon may be utilized to remove toxic components contained in engine exhaust gas or various kinds of incinerator exhaust gas.

For example, a plasma reactor which treats $NO_x$, carbon particulate, HC, and CO contained in engine exhaust gas or incinerator exhaust gas by passing the engine exhaust gas or various kinds of incinerator exhaust gas through a plasma field has been disclosed (e.g. JP-A-2001-164925).

DISCLOSURE OF THE INVENTION

However, in order to stably and uniformly generate plasma at low power consumption, the distance between electrodes (unit electrodes) constituting the plasma generating electrode must be reduced. Therefore, the number of parts is increased and assembly becomes complex, thereby resulting in poor productivity. In order to reduce pressure loss occurring when exhaust gas passes through the plasma generating electrode, thickness of the unit electrode must be reduced. However, since the unit electrode reduced in thickness tends to be deformed, the distance between the unit electrodes changes locally due to looseness of the unit electrode and is not uniform as a whole, so that plasma becomes nonuniform. Moreover, the plasma generating electrode may break due to thermal stress when thermal stress is applied to the plasma generating electrode.

The present invention has been achieved in view of the above-described problems and provides a plasma generating electrode and a plasma reactor exhibiting high productivity, capable of generating uniform and stable plasma, and exhibiting excellent heat resistance.

In order to achieve the above aim, the present invention provides the following plasma generating electrode and plasma reactor.

[1] A plasma generating electrode comprising at least a pair of unit electrodes disposed at a predetermined interval and capable of generating plasma upon application of voltage between the unit electrodes, each of the pair of unit electrodes including a plate-like ceramic body as a dielectric and a conductive film disposed inside the ceramic body and including a plurality of protrusions having a predetermined thickness and arranged in a predetermined pattern on one surface, the pair of unit electrodes (upper unit electrode and lower unit electrode) constituting one basic unit by being hierarchically layered at intervals corresponding to thickness of the protrusion in a state that a plurality of spaces which are open on each end in an arrangement direction of the protrusion are formed by a front surface of one unit electrode (lower unit electrode) of the pair of unit electrodes, surfaces of the protrusions disposed on the front surface, and a back surface of the other unit electrode (upper unit electrode), the basic units being hierarchically layered at intervals corresponding to the thickness of the protrusion and constituting an electrode unit in which the unit electrodes and the spaces are three-dimensionally arranged, the plasma generating electrode being capable of generating plasma in the three-dimensionally arranged spaces upon application of voltage between the unit electrodes constituting the electrode unit.

[2] The plasma generating electrode according to [1], wherein, in a state that, on a front surface side of a basic unit electrode having a shape in which a margin is added to an external shape of the unit electrode, a plate-like protrusion formation frame having almost the same external shape as an external shape of the basic unit electrode, having the same thickness as the thickness of the protrusion, and having a plurality of through-holes whose one side parallel to the arrangement direction of the protrusion is equal to or longer than a length of the protrusion and whose one side perpendicular to the arrangement direction of the protrusion is the same as the arrangement interval between the protrusions is disposed, the unit electrodes and the spaces which are open on each end in the arrangement direction of the protrusion are formed by cutting the basic unit electrode and the protrusion formation frame at positions corresponding to the ends of the spaces along a plane almost perpendicular to the front surface of the basic unit electrode.

[3] The plasma generating electrode according to [1] or [2], wherein the basic unit includes a first conduction through-hole and a second conduction through-hole which are formed through the basic unit in a vertical direction from regions on its top surface other than an arrangement region of the protrusions in a state that the first conduction through-hole and the second conduction through-hole are in contact with at least a part of one of the conductive films disposed in the upper unit electrode and the lower unit electrode, and electrical conduction can occur from the top surface to a bottom surface of the basic unit through the first conduction through-hole, the second conduction through-hole, and the conductive film.

[4] The plasma generating electrode according to [3], wherein the basic unit includes conductive films (first through-hole conductive film and second through-hole conductive film) disposed on inner walls of the first conduction through-hole and the second conduction through-hole, and electrical conduction can occur from the top surface to the bottom surface of the basic unit by allowing the first through-hole conductive film and the second through-hole conductive film to be in contact with the conductive films disposed in the upper unit electrode and the lower unit electrode.

[5] The plasma generating electrode according to [1] or [2], wherein the conductive films disposed in the upper unit electrode and the lower unit electrode constituting the basic unit extend to both ends of the basic unit in a direction perpendicular to the arrangement direction of the protrusion, the basic unit includes conductive films (first end face conductive film and second end face conductive film) disposed on end faces on the both ends, and electrical conduction can occur from the top surface to the bottom surface of the basic unit by allowing the first end face conductive film and the second end face conductive film to be in contact with the conductive films disposed in the upper unit electrode and the lower unit electrode.

[6] The plasma generating electrode according to any of [1] to [5], wherein an opening percentage is 20% or more.

[7] The plasma generating electrode according to any of [1] to [6], wherein the thickness of the unit electrode is 0.1 to 5 times the interval corresponding to the thickness of the protrusion.

[8] The plasma generating electrode according to any of [1] to [7], wherein a width of the protrusion is 0.1 to 5 times the interval corresponding to the thickness of the protrusion.

[9] The plasma generating electrode according to any of [1] to [8], wherein a distance between adjacent protrusions is 0.2 to 20 times the interval corresponding to the thickness of the protrusion.

[10] A plasma reactor comprising the plasma generating electrode according to any of claims 1 to 9, wherein, when gas containing predetermined components is introduced into the spaces three-dimensionally arranged between the unit electrodes constituting the plasma generating electrode (electrode unit), the plasma reactor is capable of causing the predetermined components in the gas to be reacted by plasma generated in the spaces.

Thus, according to the plasma generating electrode of the present invention, since each of a pair of unit electrodes (upper unit electrode and lower unit electrode) includes a plate-like ceramic body as a dielectric and a conductive film disposed inside the ceramic body, the plasma generating electrode can generate uniform and stable plasma. Moreover, since the basic units 1, each of which is formed by a pair of unit electrodes, are hierarchically layered to form the electrode unit, which is used as a plasma generating electrode, distortion can be reduced even if thermal stress occurs, so that a plasma generating electrode exhibiting with excellent heat resistance is obtained. Moreover, since the protrusions are arranged between the unit electrodes in a predetermined pattern, looseness deflection of the electrode plate or the like is reduced because the unit electrodes are supported by the protrusions. This allows the unit electrodes to maintain their planar shape, so that the distance between the unit electrodes is entirely constant (over the entire surface), whereby plasma becomes uniform. Moreover, since the protrusions are arranged between the unit electrodes, creeping discharge generated in the area where the protrusion is in contact with the unit electrode (corner of protrusion) extends through the space formed between the protrusions. Therefore, the creeping discharge can be transformed into uniform barrier discharge between the unit electrodes at low energy injection. Since the plasma generating electrode of the present embodiment can be produced by layering the basic units produced in advance, assembly of parts does not become complex so that the productivity can be improved.

Since the plasma reactor of the present invention includes such a plasma generating electrode, the plasma reactor exhibits its excellent productivity, can generate uniform and stable plasma, and exhibits excellent heat resistance.

BRIEF DESCRIPTION OF THE DRAWINGS

[FIG. 2(c)]

BEST MODE FOR CARRYING OUT THE INVENTION

Embodiments of the plasma generating electrode and the plasma reactor of the present invention are described below in detail with reference to the drawings. However, the present invention should not be construed as being limited to the following embodiments, and various alterations, modifications, and improvements may be made without deviating from the scope of the present invention based on knowledge of a person skilled in the art.

Figures 1A, 1B:
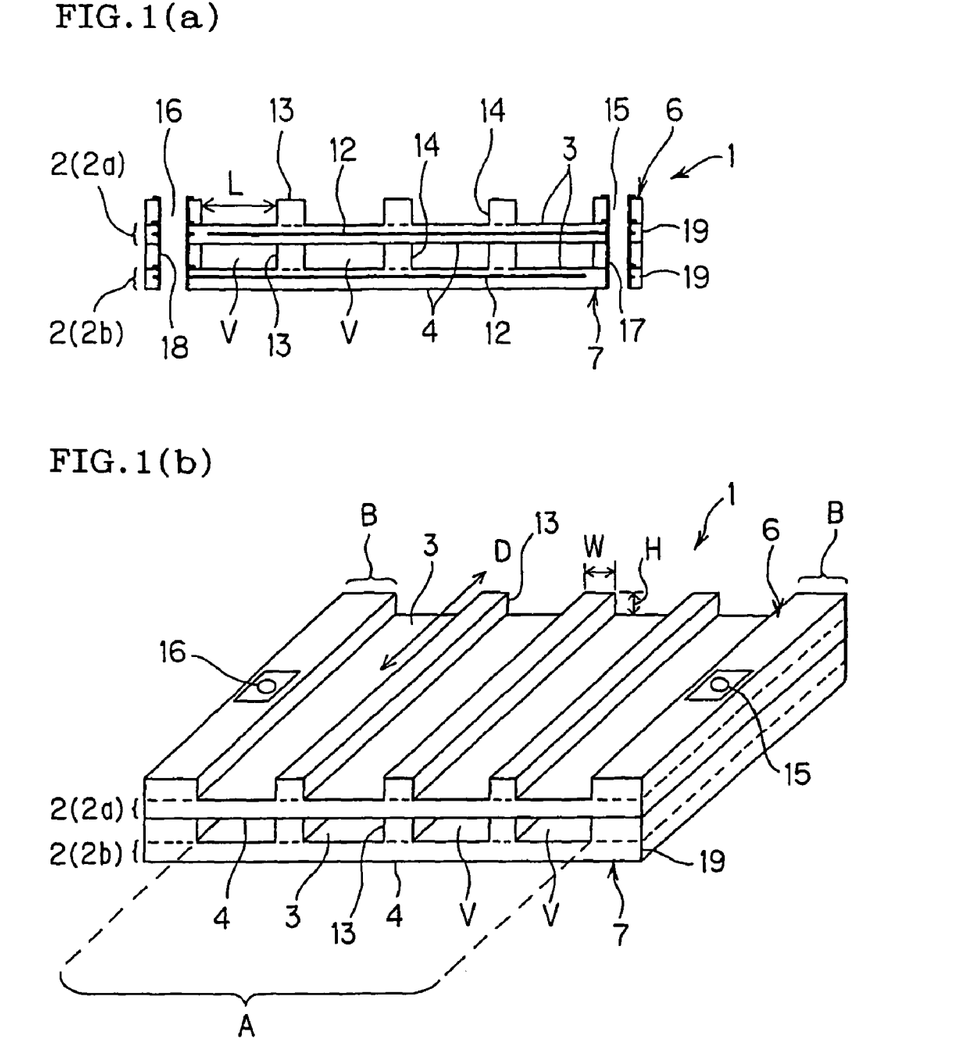
FIG. 1(a) is a cross-sectional view schematically showing a basic unit constituting one embodiment of a plasma generating electrode of the present invention along a plane perpendicular to a protrusion arrangement direction.
FIG. 1(b) is an oblique view of the basic unit shown in FIG. 1(a).
Figure 2A:
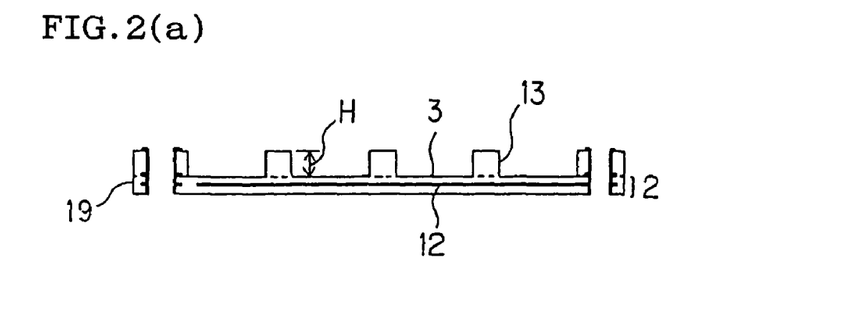
FIG. 2(a) is a cross-sectional view schematically showing a unit electrode constituting one embodiment of the plasma generating electrode of the present invention along a plane perpendicular to the protrusion arrangement direction.
Figure 2B:
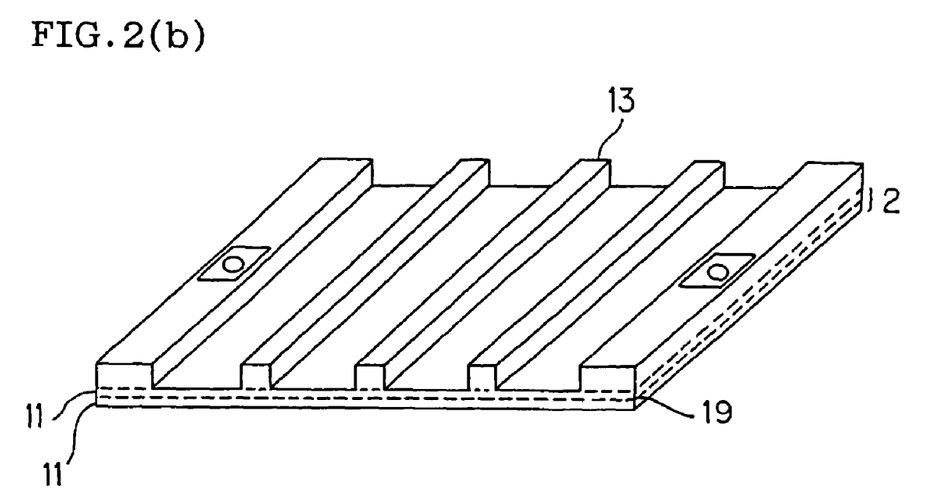
FIG. 2(b) is a perspective view of the unit electrode shown in FIG. 2(a).
Figure 2C:
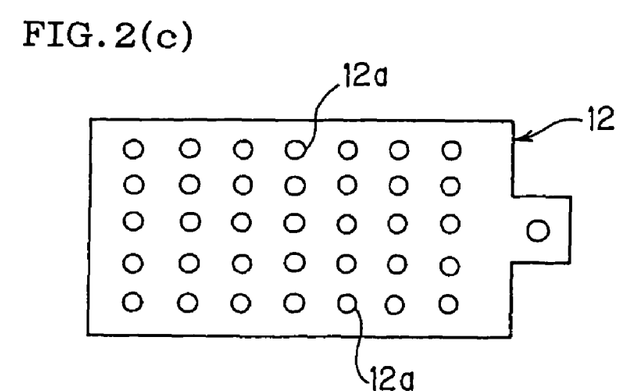
FIG. 2(c) is a plan view showing a conductive film constituting the unit electrode shown in FIG. 2(a).
Figure 3:
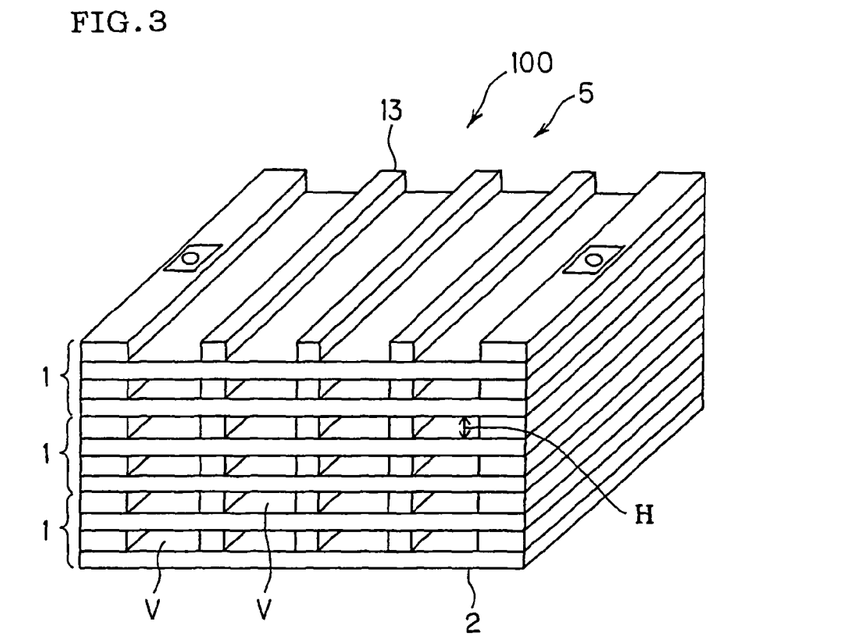
FIG. 3 is a perspective view schematically showing the plasma generating electrode of the present invention.

FIGS. 1(a) and 1(b) schematically show a basic unit constituting one embodiment of a plasma generating electrode of the present invention. FIG. 1(a) is a cross-sectional view along a plane perpendicular to a protrusion arrangement direction, and FIG. 1(b) is a perspective view. FIGS. 2(a), 2(b), and 2(c) schematically show a unit electrode constituting one embodiment of a plasma generating electrode of the present invention. FIG. 2(a) is a cross-sectional view along a plane perpendicular to a protrusion arrangement direction, FIG. 2(b) is a perspective view, and FIG. 2(c) is a plan view showing a conductive film constituting the unit electrode. FIG. 3 is a perspective view schematically showing a plasma generating electrode of the present invention.

As shown in FIG. 3, a plasma generating electrode 100 of the present embodiment is constituted by hierarchically layering three layers of basic units 1 (see FIGS. 1(a) and 1(b)) each including a pair of unit electrodes 2 (see FIGS. 2(a) and 2(b)). Therefore, the plasma generating electrode 100 includes three pairs of unit electrodes 2 (see FIGS. 2(a) and 2(b)) disposed at predetermined intervals (intervals corresponding to the thickness of a protrusion 13), and is capable of generating plasma upon application of voltage between the unit electrodes 2 (see FIGS. 2(a) and 2(b)).

As shown in FIGS. 1(a) and 1(b), the basic unit 1 constituting the plasma generating electrode 100 shown in FIG. 3 includes a pair of unit electrodes 2 (upper unit electrode 2a and lower unit electrode 2b) hierarchically layered at an interval corresponding to the thickness of the protrusion 13. As shown in FIGS. 2(a) and 2(b), each of the pair of unit electrodes 2 includes a plate-like ceramic body 19 as a dielectric and a conductive film 12 disposed inside the ceramic body 19 and has a plurality of protrusions 13 having a predetermined thickness (thickness of the protrusion) H and arranged on a front surface 3 (one surface of the unit electrode) in a predetermined pattern. The "predetermined pattern" used herein refers to a state that the protrusions 13 are arranged at approximately equal intervals and approximately in parallel. As shown in FIGS. 1(a) and 1(b), in a state that a plurality of spaces V, which are open on each end in a arrangement direction D of the protrusion 13 (protrusion arrangement direction), are formed by a front surface (one unit electrode surface) 3 of one unit electrode (lower unit electrode) 2b of the pair of unit electrodes 2, a surface (protrusion surface) 14 of the protrusion 13 disposed on the front surface 3, and a back surface (unit electrode back surface) 4 of the other unit electrode (upper unit electrode) 2a; the pair of unit electrodes (upper unit electrode 2a and lower unit electrode 2b) 2 are hierarchically layered at an interval corresponding to the thickness H of the protrusion to constitute a basic unit 1. The protrusions 13 function as walls partitioning the space formed between the upper unit electrode 2a and the lower unit electrode 2b into the spaces V. The upper unit electrode 2a and the lower unit electrode 2b are supported by the protrusions 13 so that each unit electrode is not easily deformed.

As shown in FIG. 3, the plasma generating electrode 100 of the present embodiment is constituted by an electrode unit 5 in which a plurality of (three in FIG. 3) basic units 1 are hierarchically layered at intervals corresponding to the thickness H of the protrusion and in which the unit electrodes 2 and the spaces V are three-dimensionally arranged and is capable of generating plasma in the three-dimensionally arranged spaces V upon application of voltage between the unit electrodes 2 constituting the electrode unit 5.

Thus, since each of the pair of unit electrodes (upper unit electrode and lower unit electrode) includes the plate-like ceramic body as a dielectric and the conductive film disposed inside the ceramic body, the plasma generating electrode can generate uniform and stable plasma. Moreover, since the basic units 1, each of which is constituted by a pair of unit electrodes, are hierarchically layered to form the electrode unit, which is used as plasma generating electrode, distortion can be reduced between the basic units even if thermal stress occurs, so that a plasma generating electrode exhibiting excellent heat resistance is obtained.

Moreover, since the protrusions are arranged between the unit electrodes in a predetermined pattern, deformation such as looseness is reduced because the unit electrodes are supported by the protrusions. This allows the plate-like unit electrodes to maintain their planar shape, so that the distance between adjacent unit electrodes is almost constant over the entire surface, whereby plasma becomes more uniform. That is, the protrusions function as substrates which substrate each unit electrode. Moreover, since the protrusions are arranged between the unit electrodes, creeping discharge generated at the corner of the protrusion and extending near the surface of the unit electrode extends through the space formed between the protrusions. Therefore, the creeping discharge can be transformed into uniform barrier discharge between the unit electrodes at low energy injection. Since the plasma generating electrode of the present embodiment can be produced by layering the basic units produced in advance, assembly of parts does not becomes complex, so that the productivity can be improved.

Thickness of the conductive film 12 constituting the unit electrode 2 shown in FIG. 1 is preferably 0.001 to 0.1 mm, and more preferably 0.01 to 0.05 mm in order to reduce the size of the plasma generating electrode and reduce the resistance of a treatment target fluid passed through the space between the pair of unit electrodes 2 in the case of treating exhaust gas or the like.

The conductive film 12 used in the present embodiment preferably includes metal exhibiting excellent conductivity as the major component. As suitable examples of the major component of the conductive film 12, at least one metal selected from the group consisting of tungsten, molybdenum, manganese, chromium, titanium, zirconium, nickel, iron, silver, copper, platinum, and palladium can be given. In the present embodiment, the term "major component" refers to a component accounting for 60 mass % or more of the components of the conductive film 12. When the conductive film 12 contains two or more kinds of metal selected from the above-mentioned group as the major component, the total amount of the metal accounts for 60 mass % or more of the components of the conductive film 12.

In the unit electrode 2 shown in FIG. 2, it is preferable that the conductive film 12 be applied to a tape-shaped ceramic formed body 11. As suitable examples of the application method, screen printing, calender rolling, spraying, electrostatic painting, dipping, knife coating, chemical vapor deposition, and physical vapor deposition can be given. According to these methods, the conductive film 12 exhibiting excellent surface flatness and smoothness after application and having a small thickness can easily be formed.

At the time of applying the conductive film 12 to the tape-shaped ceramic formed body 11, powder of metal mentioned above as the major component of the conductive film 12, an organic binder, and a solvent such as terpineol may be mixed together to form a conductive paste, and the conductive paste may be applied to the tape-shaped ceramic formed body 11 by using the above-mentioned method. An additive may optionally be added to the above conductive paste in order to improve adhesion to the tape-shaped ceramic formed body 11 and improve sinterability.

The adhesion between the conductive film 12 and the ceramic body 19 can be improved by adding the same component as the component of the ceramic body 19 to the metal component of the conductive film 12. A glass component may be added to the ceramic component added to the metal component. The addition of the glass component improves the sinterability of the conductive film 12 so that the density of the conductive film 12 is improved as well as adhesion. The total amount of the component of the ceramic body 19 and/or the glass component other than the metal component is preferably 30 mass % or less. If the total amount exceeds 30 mass %, the function of the conductive film 12 may not be obtained due to a decrease in resistance.

The plate-like ceramic body 19 (tape-shaped ceramic formed body 11) constituting the unit electrode 2 has the function of a dielectric as described above. By using the conductive film 12 in a state that the conductive film 12 is disposed inside the ceramic body 19, local discharge such as a spark is reduced, and small discharge can be caused at multiple locations in comparison with the case of causing discharge by using the conductive film 12 alone. Since such small discharge involves a small amount of current in comparison with discharge such as a spark or the like, power consumption can be reduced. Moreover, current which flows between the unit electrodes 2 is limited due to the presence of the dielectric, so that non-thermal plasma which does not cause an increase in temperature and consumes only a small amount of energy can be generated.

It is preferable that at least one of the unit electrodes 2 constituting the basic unit 1 include the plate-like ceramic body 19 as a dielectric and the conductive film 12 which is disposed inside the plate-like ceramic body 19 and has a plurality of conductive film through-holes 12a shown in FIG. 2(c), formed through the conductive film 12 in its thickness direction, and having a cross-sectional shape including an arc shape along a plane perpendicular to the thickness direction. The cross-sectional shape of the conductive film through-hole 12a need not include an arc shape.

More uniform discharge can be obtained at low voltage by forming the conductive film through-holes 12a in the conductive film 12.

The size of the conductive film through-hole 12a is not particularly limited. For example, it is preferable that the diameter of the conductive film through-hole 12a be 0.5 to 10 mm. This allows electric field concentration at the outer periphery of the conductive film through-hole 12a to be appropriate for discharge, so that discharge occurs well even if the voltage applied between the unit electrodes 2 is not so high. If the diameter of the conductive film through-hole 12a is less than 0.5 mm, it is so small that discharge occurring at the outer periphery of the conductive film through-hole 12a becomes similar to the above-described local point discharge, so that nonuniform plasma may be generated. If the diameter of the conductive film through-hole 12a is more than 10 mm, since discharge hardly occurs inside the conductive film through-hole 12a, the density of plasma generated between the unit electrodes 2 may be decreased.

In the present embodiment, it is preferable that the conductive film through-holes 12a be regularly arranged. It is preferable that the center-to-center distance between adjacent conductive film through-holes 12a appropriately be determined according to the diameters of the conductive film through-holes 12a so that uniform plasma can be generated at high density. For example, it is preferable that the center-to-center distance between adjacent conductive film through-holes 12a be 1 to 20 mm although the center-to-center distance is not limited thereto.

It is preferable that the conductive film through-hole 12a be formed so that the length of the outer periphery of the conductive film through-hole 12a per unit area is long. This enables the length of the region in which a nonuniform electric field occurs, that is, the outer periphery acting as a plasma generation point to be increased per unit area, so that much discharge per unit area is caused, whereby plasma can be generated at high density. A specific length of the outer periphery of the conductive film through-hole 12a per unit area ($mm/mm^2$) may appropriately be determined depending on intensity of plasma to be generated or the like. In the case of treating automotive exhaust gas, the length of the outer periphery of the conductive film through-hole 12a per unit area is preferably 0.05 to 1.7 $mm/mm^2$. If the length of the outer periphery of the conductive film through-hole 12a per unit area is less than 0.05 $mm/mm^2$, local discharge may occur so that it may become difficult to obtain a stable discharge space. If the length of the outer periphery of the conductive film through-hole 12a per unit area is more than 1.7 $mm/mm^2$, the resistance of the conductive film may be increased, whereby discharge efficiency may be decreased.

In the present embodiment, it is preferable that the area of the conductive film having the conductive film through-hole 12a per unit area be 0.1 to 0.98 $mm^2/mm^2$. If the area of the conductive film per unit area is less than 0.1 $mm^2/mm^2$, it may become difficult to cause discharge in an amount necessary for purifying exhaust gas due to too small electrostatic capacitance of the dielectric electrode. If the area of the conductive film per unit area is more than 0.98 $mm^2/mm^2$, it may be difficult to obtain uniform discharge effect due to the conductive film through-holes, so that local discharge may easily occur.

The plate-like ceramic body 19 (tape-shaped ceramic formed body 11) preferably includes material having a high dielectric constant as the major component. As the material for the plate-like ceramic body 19, aluminum oxide, zirconium oxide, silicon oxide, cordierite, mullite, titanium-barium type oxide, magnesium-calcium-titanium type oxide, barium-titanium-zinc type oxide, silicon nitride, aluminum nitride, or the like may suitably be used. The plasma generating electrode can be operated at high temperature by using material exhibiting excellent thermal shock resistance as the major component.

For example, a copper metallization technology may be used for a lower-temperature co-fired substrate material (LTCC) in which a glass component is added to aluminum oxide ($Al_2O_3$). The use of the copper metallization technology enables production of an electrode having a low resistance and high discharge efficiency, so that the size of the electrode can be reduced. This enables design preventing thermal stress, whereby the low strength problem can be solved. In the case of producing an electrode by using a high-dielectric-constant material such as barium titanate, magnesium-calcium-titanium type oxide, or barium-titanium-zinc type oxide, the size of the electrode can be reduced due to high discharge efficiency. Therefore, it is possible to design a structure which can reduce occurrence of thermal stress due to high thermal expansion.

When the plate-like ceramic body 19 is formed by using the tape-shaped ceramic formed body 11, the thickness of the tape-shaped ceramic formed body 11 is preferably 0.1 to 3 mm although the thickness of the ceramic formed body 11 is not particularly limited. If the thickness of the tape-shaped ceramic formed body 11 is less than 0.1 mm, a pair of adjacent unit electrodes 2 may not be electrically insulated. If the thickness of the tape-shaped ceramic formed body 11 exceeds 3 mm, a reduction in space may be hindered since the thickness of the tape-shaped ceramic formed body 11 exceeds the thickness necessary as a dielectric.

As the tape-shaped ceramic formed body 11, a ceramic green sheet used for a ceramic substrate may suitably be used. The ceramic green sheet may be obtained by forming slurry or paste for a green sheet to have a predetermined thickness by using a conventionally known method such as a doctor blade method, a calender method, a printing method, or a reverse roll coating method. The resulting ceramic green sheet may be subjected to cutting, grinding, punching, or communicating hole formation, or may be used as an integral laminate in which a plurality of green sheets are layered and bonded by thermocompression bonding or the like.

As the slurry or paste for a green sheet, a mixture prepared by mixing an appropriate binder, sintering agent, plasticizer, dispersant, organic solvent, and the like into a predetermined ceramic powder may suitably be used. As suitable examples of the ceramic powder, alumina, mullite, cordierite, silicon nitride, aluminum nitride, ceramic glass, glass, and the like can be given. As suitable examples of the sintering agent, silicon oxide, magnesium oxide, calcium oxide, titanium oxide, zirconium oxide, and the like can be given in the case of alumina. The sintering agent is preferably added in an amount of 3 to 10 parts by mass for 100 parts by mass of the ceramic powder. As the plasticizer, dispersant, and organic solvent, those used for a conventionally known method may suitably be used.

Porosity of the plate-like ceramic body 19 (tape-shaped ceramic formed body 11) is preferably 0.1 to 35%, and more preferably 0.1 to 10%. This allows plasma to be efficiently generated between the upper unit electrode 2a and the lower unit electrode 2b including the plate-like ceramic body 19 (tape-shaped ceramic formed body 11), so that energy saving can be realized.

It is preferable that the unit electrode 2 be formed by disposing the conductive film 12 on the surface of the tape-shaped ceramic body 11 and disposing the tape-shaped ceramic body 11 over the conductive film 12 so that the conductive film 12 is held between the two tape-shaped ceramic bodies 11.

In FIGS. 1(a) and 1(b), it is preferable that material for the protrusion 13 disposed on a front surface of the unit electrode 2 be similar to the material for the plate-like ceramic body 19. It is preferable that the thickness H of the protrusion be 0.1 to 3 mm, and the distance L between adjacent protrusions 13 be 1 to 50 mm. As the distance L between the protrusions 13 is smaller, transformation from creeping discharge to barrier discharge can occur at a low energy injection, even if the unit electrodes 2 are not completely disposed in parallel. In particular, the energy efficiency is improved in the case of using materials having the same dielectric constant for the protrusion 13 as that of the unit electrode 2 and layering and integrally firing the basic units 1. The width W of the protrusion 13 is preferably 0.1 to 5 mm. This enables uniform plasma to be more efficiently generated in the space V and allows exhaust gas to flow in the space V at a low resistance.

As shown in FIGS. 1(a) and 1(b), in order to electrify the basic unit 1, the basic unit 1 includes a first conduction through-hole 15 and a second conduction through-hole 16 (hereinafter may be called "conduction through-holes 15 and 16") which are formed through the basic unit 1 in the vertical direction from the top surface (top surface of the basic unit) 6 in regions B other than a protrusion arrangement region A (regions other than the protrusion arrangement region) through the conductive films 12 disposed in the upper unit electrode 2a and the lower unit electrode 2b in a state that the first conduction through-hole 15 and the second conduction through-hole 16 are in contact with the conductive films 12. The first conduction through-hole 15 and the second conduction through-hole 16 are used to secure electrical conduction between the conductive films 12 of the unit electrodes 2 constituting the basic unit 1 and pass through at least the ceramic body 19 which covers the conductive film 12. It suffices that the conduction through-holes 15 and 16 be in contact with the conductive film 12. The conduction through-holes 15 and 16 may pass through the conductive film 12 together with the ceramic body 19, or need not pass through the conductive film 12. It is preferable that the conduction through-holes 15 and 16 pass through the conductive film 12 together with the ceramic body 19 in order to facilitate electrical connection of the conductive films 12. It is preferable that the basic unit 1 include conductive films (first through-hole conductive film 17 and second through-hole conductive film 18) provided on the inner walls of the first conduction through-hole 15 and the second conduction through-hole 16 and that the first through-hole conductive film 17 and the second through-hole conductive film 18 be in contact with the conductive films 12 disposed in the upper unit electrode 2a and the lower unit electrode 2b to enable electrical conduction from the top surface 6 of the basic unit to the bottom side 7 of the basic unit. The material, thickness, and the like of the first through-hole conductive film 17 and the second through-hole conductive film 18 are preferably similar to those of the above-described conductive film 12. It is preferable to provide a protective film on the surfaces of the conductive films 17 and 18. It is preferable that the protective film be at least one metal film selected from the group consisting of nickel-boron, nickel-phosphorus, cobalt-boron, cobalt-phosphorus, chromium, iron, silver, silver-palladium, platinum, and gold. A method of forming a dense metal film may be selected from electroplating, electroless plating, chemical vapor deposition, physical vapor deposition, hot dipping, spraying, and the like.

Figure 4:
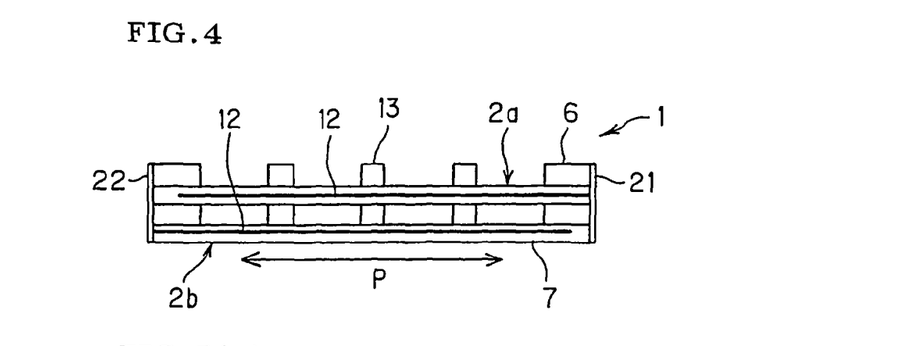
FIG. 4 is a cross-sectional view schematically showing the basic unit constituting one embodiment of the plasma generating electrode of the present invention along a plane perpendicular to the protrusion arrangement direction.

As shown in FIG. 4, the conductive films 12 provided in the upper unit electrode 2a and the lower unit electrode 2b constituting the basic unit 1 may extend to both ends of the basic unit 1 in the direction P perpendicular to the arrangement direction of the protrusion 13 (direction perpendicular to the protrusion on the unit electrode 2), the basic unit 1 may have conductive films (first end face conductive film 21 and second end face conductive film 22) provided on both end faces, and the first end face conductive film 21 and the second end face conductive film 22 may be in contact with the conductive films 12 disposed in the upper unit electrode 2a and the lower unit electrode 2b to enable electrical conduction from the top surface 6 of the basic unit to the bottom side 7 of the basic unit. FIG. 4 is a cross-sectional view schematically showing the basic unit constituting one embodiment of the plasma generating electrode of the present invention along a plane perpendicular to the protrusion arrangement direction. The material, thickness, and the like of the first end face conductive film 21 and the second end face conductive film 22 are preferably similar to those of the above-described conductive film 12. It is preferable to provide a protective film on the surfaces of the conductive films 21 and 22.

Figure 5A:
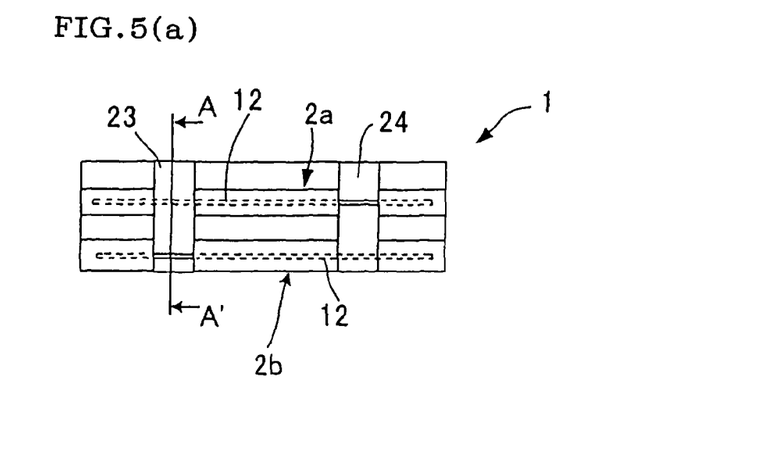
FIG. 5(a) is a side view schematically showing the basic unit constituting one embodiment of the plasma generating electrode of the present invention viewed from a direction parallel to the unit electrode and perpendicular to the protrusion.
Figure 5B:
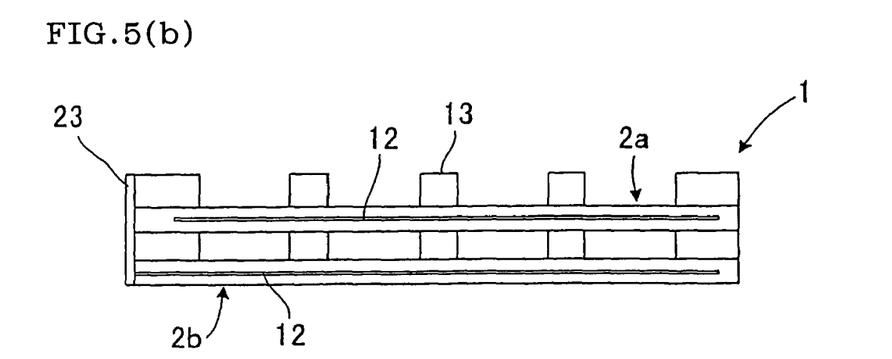
FIG. 5(b) is a cross-sectional view along the line A-A' shown in FIG. 5(a).

As shown in FIGS. 5(a) and 5(b), at least a part of the conductive film 12 disposed in each of the upper unit electrode 2a and the lower unit electrode 2b extends to one end in the direction P, the upper unit electrode 2a may be connected with a second end face conductive film 24 disposed on the above-mentioned one end of the basic unit 1 to extend in the shape of a strip in the direction perpendicular to the unit electrode 2a, and the lower unit electrode 2b may be connected with a first end face conductive film 23 disposed on the above-mentioned one end of the basic unit 1 to extend in the shape of a strip in the direction perpendicular to the unit electrode 2b, so that an electricity supply mechanism may be formed on only one end of the basic unit 1. As shown in FIG. 5(a), the conductive film 12 of the upper unit electrode 2a is connected with the second end face conductive film 24 and is not connected with the first end face conductive film 23. The conductive film 12 of the lower unit electrode 2b is connected with the first end face conductive film 23 and is not connected with the second end face conductive film 24. It is preferable that the first end face conductive film 23 and the second end face conductive film 24 extend to both ends in the direction perpendicular to the unit electrode 2 of the basic unit 1, and, when the basic units 1 are limited, be respectively connected with the first end face conductive film 23 and the second end face conductive film 24 of the adjacent basic unit 1 to allow electrical conduction. FIG. 5 schematically shows the basic unit constituting one embodiment of the plasma generating electrode of the present invention. FIG. 5(a) is a side view of the basic unit 1 viewed from the direction parallel to the unit electrode 2 and perpendicular to the protrusion, and FIG. 5(b) is a cross-sectional view along the line A-A' shown in FIG. 5(a).

Figure 6:
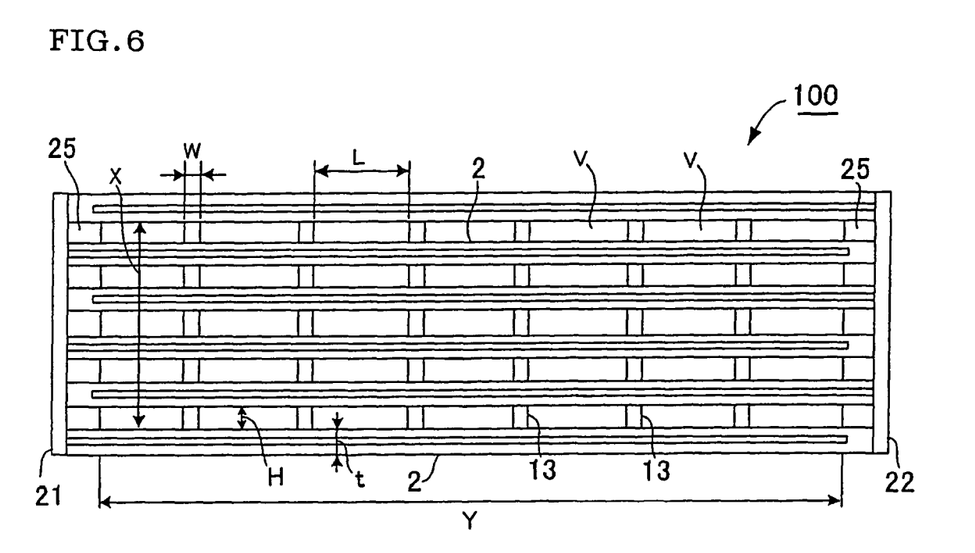
FIG. 6 is a cross-sectional view of the plasma generating electrode of the present embodiment along a plane perpendicular to the protrusion arrangement direction.

In the plasma generating electrode 100 of the present embodiment, it is preferable that the opening percentage defined below be 20% or more, and more preferably 50% or more. If the opening percentage is less than 20%, the backpressure is increased when it is used for an engine exhaust gas system so that the engine performance may be affected. The opening percentage used herein refers to the percentage of the "total area of the region corresponding to the spaces V through which gas flows" with respect to the "area of the total space" in the cross section of the plasma generating electrode along a plane perpendicular to the protrusion arrangement direction. The "total space" used herein refers to the entire region in which the spaces V are formed in the cross section of the plasma generating electrode 100 shown in FIG. 6. The region is defined in the height direction as a region between the unit electrode 2 positioned at the top of the plasma generating electrode 100 and the unit electrode 2 positioned at the bottom of the plasma generating electrode 100. The region is defined in the width direction as a region between two outer frames 25 disposed in parallel to the protrusion 13 on both ends of the unit electrode 2. Therefore, the area of the total space is a product of the distance X in the height direction and the distance Y in the width direction of the above-mentioned region. The total area of the region corresponding to the spaces V is a value obtained by adding the areas of the regions corresponding to the spaces V. FIG. 6 is a cross-sectional view of the plasma generating electrode 100 of the present embodiment along a plane perpendicular to the protrusion arrangement direction.

In the plasma generating electrode 100 of the present embodiment, it is preferable that the thickness t of the unit electrode 2 shown in FIG. 6 be 0.1 to 5 times, and more preferably 0.2 to 2 times the interval between the unit electrodes 2 corresponding to the thickness H of the protrusion 13. If the thickness t is less than 0.1 times the interval between the unit electrodes 2, breakdown may occur due to the reduced thickness of the unit electrode 2, so that it may be difficult to obtain uniform discharge. If the thickness t is greater than five times the interval between the unit electrodes 2, the opening percentage becomes less than 20%, so that the engine performance may be affected.

In the plasma generating electrode 100 of the present embodiment, it is preferable that the width W of the protrusion 13 shown in FIG. 6 be 0.1 to 5 times, and more preferably 0.2 to 2 times the interval corresponding to the thickness H of the protrusion 13. If the width W of the protrusion 13 is less than 0.1 times the interval, the strength reliability of the plasma generating electrode 100 as a structure may be decreased. If the width W of the protrusion 13 is greater than five times the interval, the amount of energy entering the space V is decreased due to large in capacitance of the protrusion 13, so that plasma may not be obtained with high efficiency.

It is preferable that the distance L between adjacent protrusions 13 be 0.2 to 20 times, and more preferably 0.5 to 10 times the interval corresponding to the thickness H of the protrusion 13. If the distance L is less than 0.2 times the interval, the engine performance may be decreased when the plasma generating electrode is used for an engine exhaust gas system. If the distance L is greater than 20 times the interval, since the interval between adjacent protrusions 13 is increased, creeping discharge may not efficiently be transformed into barrier discharge. In this case, it may be necessary to provide a large amount of energy in order to obtain uniform discharge.

A method of manufacturing the plasma generating electrode of the present embodiment is described below in detail.

A ceramic green sheet to serve as the above ceramic formed body is provided. For example, the above sintering agent, a binder such as a butyral resin or a cellulose resin, a plasticizer such as DOP or DBP, an organic solvent such as toluene or butadiene, and the like are added to at least one kind of material selected from the group consisting of alumina, mullite, zirconia, cordierite, silicon nitride, aluminum nitride, ceramic glass, and glass. The components are sufficiently mixed by using an alumina pot and an alumina ball to prepare slurry for a green sheet. The slurry for a green sheet may be prepared by mixing the materials by ball milling using a mono ball.

The resulting slurry for a green sheet is stirred under reduced pressure for degassing, and adjusted to have a predetermined viscosity. The thus adjusted slurry for a green sheet is formed in the shape of a tape by using a tape forming method such as a doctor blade method to form an unfired ceramic formed body.

Meanwhile, a conductive paste for forming a conductive film disposed on one surface of the unfired ceramic formed body is provided. The conductive paste may be prepared by adding a binder and a solvent such as terpineol to silver powder and sufficiently kneading the mixture by using a triroll mill, for example.

Figure 7:
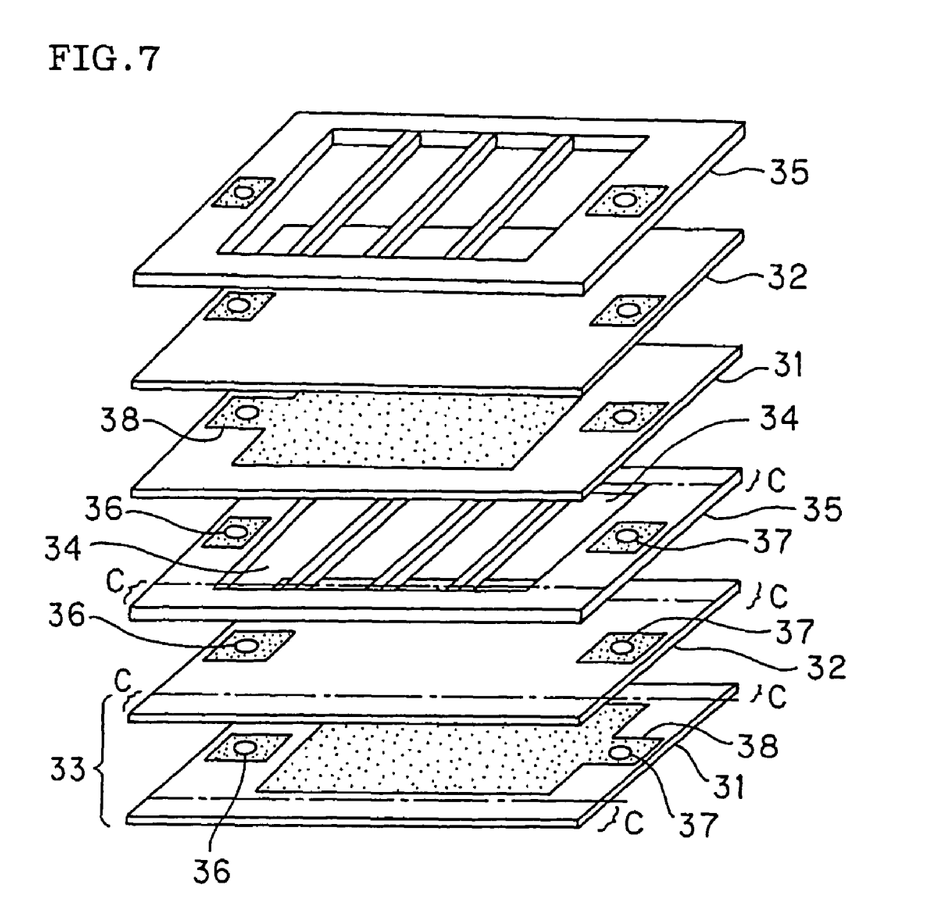
FIG. 7 is a perspective view schematically showing a process of manufacturing one embodiment of the plasma generating electrode of the present invention.

The resulting conductive paste is printed on the surface of the unfired ceramic formed body by screen printing or the like to form a conductive film having a predetermined shape to obtain a conductive film-containing unfired ceramic formed body 31 shown in FIG. 7. Each end of the conductive film-containing unfired ceramic formed body 31 in one direction has a margin C which is removed later by cutting. The conductive film covers almost the entire surface of the unfired ceramic formed body with the central portion of the surface of the unfired ceramic formed body being centered, and is disposed in the quadrilateral shape at the middle in the width direction (one direction) on each end in which the margin C is not provided. One of the quadrilateral conductive films is continuously formed with the conductive film which covers almost the entire surface of the unfired ceramic formed body with the central portion of the surface of the unfired ceramic formed body being centered. FIG. 7 is a perspective view schematically showing the process of manufacturing one embodiment of the plasma generating electrode of the present invention.

As shown in FIG. 7, an unfired ceramic formed body 32 produced in the same manner as the conductive film-containing unfired ceramic formed body 31 and having only quadrilateral conductive films on both ends is disposed on the surface of the conductive film-containing unfired ceramic formed body 31 on the side on which the conductive film is disposed to form a basic unit electrode 33 in which the conductive film is held between two unfired ceramic formed bodies. The unfired ceramic formed body 32 is preferably disposed at a temperature of 100° C. while applying a pressure of 10 MPa. The external shape of the unfired ceramic formed body 32 is almost the same as the external shape of the conductive film-containing unfired ceramic formed body 31. The resulting basic unit electrode 33 has the margin C which is removed later by cutting.

As shown in FIG. 7, a plate-like protrusion formation frame 35 having almost the same external shape as that of the unit electrode 33, having the same thickness as the thickness of the protrusion 13 (see FIGS. 1(a) and 1(b)) when it is formed in the basic unit 1 (see FIGS. 1(a) and 1(b)) and having a plurality of through-holes 34 of which the side parallel to the protrusion arrangement direction is longer than the length of the protrusion 13 (see FIGS. 1(a) and 1(b)) to some extent and of which the side perpendicular to the protrusion arrangement direction is the same as the arrangement interval between the protrusions 13 (see FIGS. 1(a) and 1(b)) is disposed on one surface of the basic unit electrode 33. The protrusion formation frame 35 is cut into a predetermined shape by using a knife. Quadrilateral conductive films are disposed on the protrusion formation frame 35 at positions which overlap the quadrilateral conductive films of the basic unit electrode 33. The conductive films disposed on both ends need not be quadrilateral, but may be circular, elliptical, or polygonal, or may have an indeterminate shape. The length of the side of the through-hole 34 parallel to the protrusion arrangement direction may be the same as the length of the protrusion 13 (see FIGS. 1(a) and 1(b)). The protrusion formation frame 35 has the margin C on both ends of the through-hole 34 in the direction perpendicular to the protrusion arrangement direction. The protrusion formation frame 35 is preferably disposed at a temperature of 100° C. while applying a pressure of 10 MPa.

A conduction through-hole (first conduction through-hole 36 and second conduction through-hole 37) is formed in the basic unit electrode 33 and the protrusion formation frame 35 on both ends without the margin C so that the conduction through-hole is in contact with the quadrilateral conductive film.

Next, a unit electrode similar to the basic unit electrode 33 obtained as described above on which the protrusion formation frame 35 is disposed is produced. As shown in FIG. 7, the basic unit electrodes 33 on which the protrusion formation frame 35 is disposed are layered so that the electrode terminals 38 of the conductive film-containing unfired ceramic formed bodies 31 face opposite directions. This allows an unfired basic unit having the margin C to be formed. The unit electrodes 33 are preferably layered at a temperature of 100° C. while applying a pressure of 10 MPa. In the present embodiment, the conductive film-containing unfired ceramic formed bodies 31 are disposed so that the electrode terminals 38 face opposite directions. However, the conductive film-containing unfired ceramic formed bodies 31 may be disposed to face the same direction with avoiding overlapping of the electrode terminals 38.

The resulting unfired basic units having the margin C are layered, for example, in three stages to form an unfired electrode unit having the margin C. The number of basic units layered is not limited to three. An arbitrary number of basic units may be layered depending on the objective. The basic units are preferably layered at a temperature of 100° C. while applying a pressure of 10 MPa. The connection state between the basic units becomes more flexible in comparison with the connection state between the ceramic formed bodies in the basic unit when the plasma generating electrode is produced by firing by preparing the unfired basic units having the margin C in advance and layering the basic units as necessary. Therefore, even if distortion due to thermal stress occurs, breakage can be prevented by absorbing the distortion between the basic units. Moreover, since the basic units can be prepared in advance and the electrode unit can be produced by layering the basic units, the assembly of parts does not become complex, so that the productivity can be improved.

After layering the basic units, the margins C of the basic unit electrode 33 and the protrusion formation frame 35 are removed by cutting along a plane approximately perpendicular to the surface of the basic unit electrode 33. This allows both ends of the through-hole 34 in the protrusion formation frame 35 in the direction perpendicular to the protrusion arrangement direction to be open, so that the protrusions 13 and the spaces V of the basic unit 1 shown in FIGS. 1(a) and 1(b) which are open on each end in the arrangement direction D of the protrusions 13 are formed to obtain the shape of the unit electrode 2 and the basic unit 1. The range of the margin C of each of the basic unit electrode 33 and the protrusion formation frame 35 is formed so that both ends of the through-hole 34 in the protrusion formation frame 35 in the direction perpendicular to the protrusion arrangement direction are open when the margin C is removed by cutting.

The resulting unfired electrode units are fired to produce the electrode unit 5 shown in FIG. 3 in which the basic units 1 are hierarchically layered at the interval corresponding to the thickness of the protrusion 13 and the unit electrodes 2 and the spaces V are three-dimensionally arranged to obtain the plasma generating electrode 100.

As described above, in the plasma generating electrode of the present embodiment, it is preferable that the unit electrodes 2 and the spaces V which are open on each end in the arrangement direction D of the protrusion 13 be formed by cutting the basic unit electrode 33 (see FIG. 7) and the protrusion formation frame 35 (see FIG. 7) at the positions of both ends of the spaces V along a plane almost perpendicular to one surface of the basic unit electrode 33 (see FIG. 7) in a state that the plate-like protrusion formation frame 35 (see FIG. 7) having about the same external shape as that of the basic unit electrode 33 (see FIG. 7), having the same thickness as the thickness of the protrusion 13, and having the through-holes 34 (see FIG. 7) whose the side parallel to the protrusion arrangement direction is equal to or longer than the protrusion 13 and whose the side perpendicular to the protrusion arrangement direction is the same as the arrangement interval between the protrusions 13 is disposed on one surface of the basic unit electrode 33 having a shape in which the margin C (see FIG. 7) is added to the external shape of the unit electrode 2 (see FIG. 7).

The plasma generating electrode of the present embodiment may be manufactured by using the following method. A protrusion-disposed ceramic body 41 shown in FIG. 8, in which protrusions 43 are provided almost in parallel on a plate-like ceramic body 42, is formed by extrusion, and an end face conductive film 47 is provided at the end face. A plate-like ceramic body 44 which constitutes a conductive film-containing ceramic body 46 shown in FIG. 9 is formed by extrusion. As the formation method for the protrusion-disposed ceramic body 41 and the plate-like ceramic body 44, a sintering agent, a forming agent such as methyl cellulose, a surfactant, and water are added to at least one kind of material selected from the group consisting of alumina, mullite, zirconia, cordierite, mullite, titanium-barium type oxide, magnesium-calcium-titanium type oxide, barium-titanium-zinc oxide, silicon nitride, aluminum nitride, ceramic glass, and glass. The components are kneaded to obtain a rod-shaped product by using a clay extruder. The resulting product is extruded by using a plunger type extruder to obtain the protrusion-disposed ceramic body 41 shown in FIG. 8 and the plate-like ceramic formed body 44 shown in FIG. 9.

As shown in FIG. 9, a conductive film 45 is provided on the plate-like ceramic body 44 by printing the conductive film 45 by using a screen printing method, for example. The material for the conductive film 45, the method of providing the conductive film 45 in the ceramic body 44, and the like are preferably the same as those of the above method of manufacturing the plasma generating electrode of the present embodiment.

After printing the conductive film, the protrusion-disposed ceramic body 41 is layered on one side of the plate-like ceramic body 44 shown in FIG. 9 by applying paste having the same composition as that of the forming material to obtain a basic unit. After layering the basic units in stages by applying a paste having the same composition as that of the forming material, the resulting product is dried and fired to obtain an integrally layered electrode unit. This electrode unit may be used as the plasma generating electrode of the present embodiment. An integrally layered electrode unit may be obtained by, after drying the basic unit, applying a paste having the same composition as that of the forming material, drying the applied paste, and firing the resulting product.

Figures 10A, 10B:
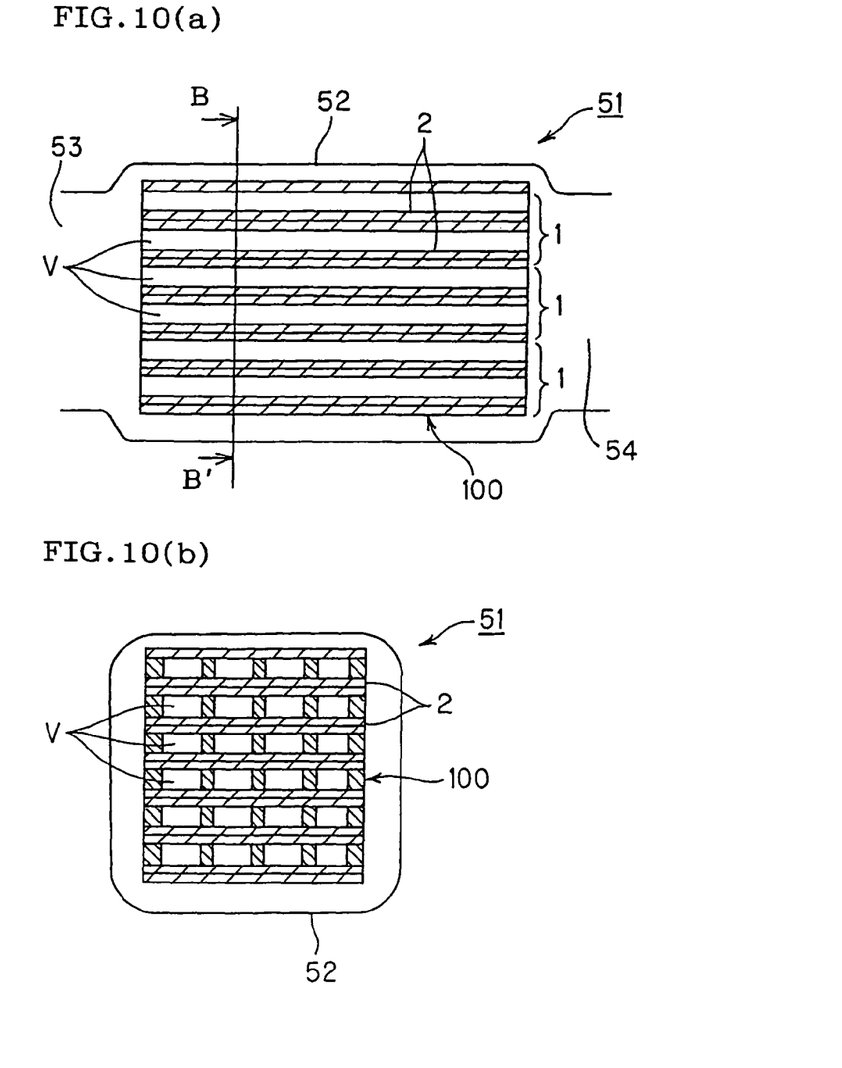
FIG. 10(a) is a cross-sectional view schematically showing one embodiment of a plasma reactor of the present invention along a plane including a direction in which a treatment target fluid passes and perpendicular to the unit electrode.
FIG. 10(b) is a cross-sectional view along the line B-B' shown in FIG. 10(a).

One embodiment of a plasma reactor of the present invention is described below. FIGS. 10(*a*) and 10(*b*) schematically show one embodiment of a plasma reactor of the present invention. FIG. 10(*a*) is a cross-sectional view along a plane including the treatment target fluid flow direction and perpendicular to the unit electrode, and FIG. 10(*b*) is a cross-sectional view along the line B-B' perpendicular to the treatment target fluid flow direction shown in FIG. 10(*a*). As shown in FIGS. 10(*a*) and 10(*b*), a plasma reactor 51 of the present embodiment includes one embodiment of the plasma generating electrode of the present invention shown in FIG. 3 (plasma generating electrode 100). Specifically, the plasma reactor 51 of the present embodiment includes the plasma generating electrode 100, and a casing 52 in which the plasma generating electrode 100 is placed in a state that gas (treatment target fluid) containing predetermined components can be introduced into the spaces V three-dimensionally arranged between the unit electrodes 2. The casing 52 includes an inlet port 53 through which the treatment target fluid flows into the plasma reactor 51 and an outlet port 54 through which the treatment target fluid which has passed through the space between the unit electrodes 2 and has been treated (treated fluid) is discharged. The plasma reactor 51 of the present embodiment configured as described above allows, when gas containing predetermined components is introduced into the spaces V, the predetermined components in the gas to be reacted by plasma generated in the spaces V.

Since the plasma reactor 51 of the present embodiment includes the plasma generating electrode 100 shown in FIG. 3, the plasma reactor 51 can generate uniform and stable plasma at low power consumption.

In the plasma reactor 51 of the present embodiment, it is preferable to provide a buffer material having insulating properties and heat resistance between the casing 52 and the plasma generating electrode 100 in order to prevent breakage when the plasma generating electrode 100 is disposed. FIG. 10 illustrates a state that three basic units 1 are layered for convenience of illustration. However, the number of basic units 1 to be layered is not limited to three.

The material for the casing 52 used in the present embodiment is not particularly limited. For example, it is preferable to use ferritic stainless steel having excellent conductivity, being lightweight and inexpensive, and showing only a small amount of deformation due to thermal expansion as a material for the casing 52.

The plasma reactor 51 configured as described above may be installed in an automotive exhaust system, for example. In this case, exhaust gas is passed through plasma generated in the space V formed between the unit electrodes 2 so that toxic substances such as soot and nitrogen oxide contained in the exhaust gas are reacted and discharged to the outside as a nonhazardous gas.

When a plurality of basic units 1 are layered, plasma is generated between the layered basic units 1. Specifically, the plasma reactor 51 is configured so that discharge occurs not only between the upper unit electrode constituting one basic unit 1 and the lower unit electrode disposed opposite to the upper unit electrode, but also between the upper unit electrode and the lower unit electrode constituting the adjacent basic unit 1, so that plasma can be generated between the layered plasma generating electrodes 1.

The plasma reactor of the present embodiment may include a power source (not shown) for applying voltage to the plasma generating electrode. As the power source, a conventionally known power source which can supply electricity so that plasma can effectively be generated may be used.

The plasma reactor of the present embodiment may be configured so that current is supplied from an external power source instead of providing a power source in the plasma reactor.

Current supplied to the plasma generating electrode used in the present embodiment may appropriately be selected depending on intensity of plasma to be generated. When the plasma reactor is installed in an automotive exhaust system, it is preferable that current supplied to the plasma generating electrode be a direct current at a voltage of 1 kV or more, a pulsed current having a peak voltage of 1 kV or more and a pulse rate per second of 100 or more (100 Hz or more), an alternating current having a peak voltage of 1 kV or more and a frequency of 100 Hz or more, or a current generated by superimposing one on another among these currents. This enables efficient generation of plasma.

The present invention is described below in more detail by way of examples. However, the present invention should not be construed as being limited to the following examples.

Example 1

A unit in which the unit electrodes 2 (alumina dielectric electrodes) shown in FIG. 3 were layered in six stages (six-stage electrode unit) was produced. The size of the electrode in one stage was 50×100×1 mm, and the internal conductive film (electrode) was printed with a tungsten paste in the area of 40×80 mm to have a thickness of 10 μm. Conductive film through-holes having a diameter of 3 mm and an interval of 5 mm were regularly arranged in the conductive film so that the center of each through-hole was positioned at a vertex of an equilateral triangle. Protrusions having a width of 2 mm and a height of 1 mm were provided at intervals of 18 mm. A protrusion having a width of 8 mm and a height of 1 mm was provided on each end of the electrode, and a conduction through-hole having a diameter of 3 mm was formed at the center. A conductive film was formed in the conduction through-hole by using a tungsten paste and nickel plating on the tungsten paste.

Ten six-stage electrode units having a thickness of 12 mm were stacked and fixed by using a metal frame, held at the outer circumference by using a thermoresistant mat, and placed in a cylindrical container made of SUS430 to obtain a plasma reactor.

The plasma reactor was installed in a burner spalling device, and a 100-600° C. heating-cooling test (burner spalling test) was conducted. After 1000 cycles of the test, the six-stage electrode unit inside the metal container was observed. As a result, breakage or the like was not observed.

As the burner spalling device, a device which can alternately supply high-temperature combustion gas from a gas burner and cooling gas to the plasma reactor was used.

The plasma reactors of Example 1 was subjected to a vibration test at 30 G and 200 Hz. After 100 hours of the test, the six-stage electrode unit inside the metal container was observed. As a result, breakage or the like was not observed.

Comparative Example 1

Sixty electrodes were stacked at intervals of 1 mm while using the same structure of the one-stage unit electrode (dielectric electrode) as in Example 1 to produce an integrally fired electrode unit. The electrode unit was placed in a cylindrical container made of SUS430 to obtain a plasma reactor. The burner spalling test was conducted in the same manner as in the Example 1. The electrode unit broke in the first stage of 100-600° C. heating-cooling.

Comparative Example 2

Sixty electrodes (50×100×1 mm) were stacked with alumina spacers having a width of 8 mm and a thickness of 1 mm interposed therebetween at both ends of the electrodes and fixed by using a metal frame to produce an electrode unit. The electrode unit was placed in a cylindrical container made of SUS430 to obtain a plasma reactor.

The above vibration test was conducted. As a result, the electrode unit broke within one hour.

Example 2

Figure 8:
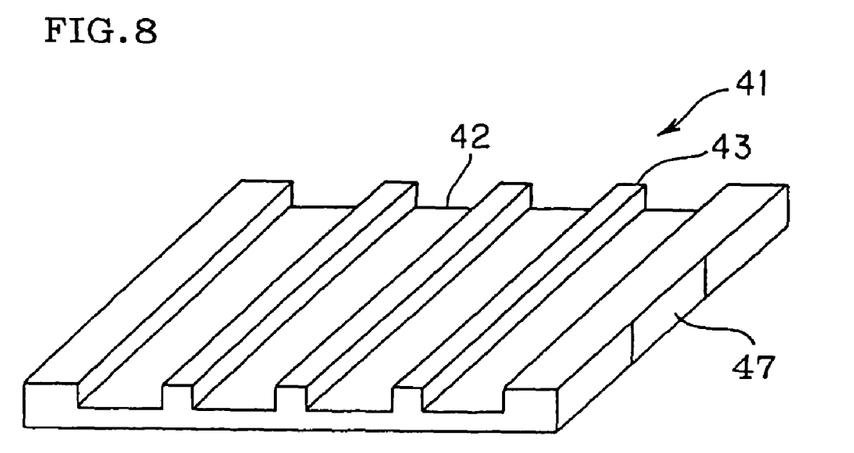
FIG. 8 is a perspective view schematically showing a protrusion-arranged ceramic body constituting one embodiment of the plasma generating electrode of the present invention.
Figure 9:
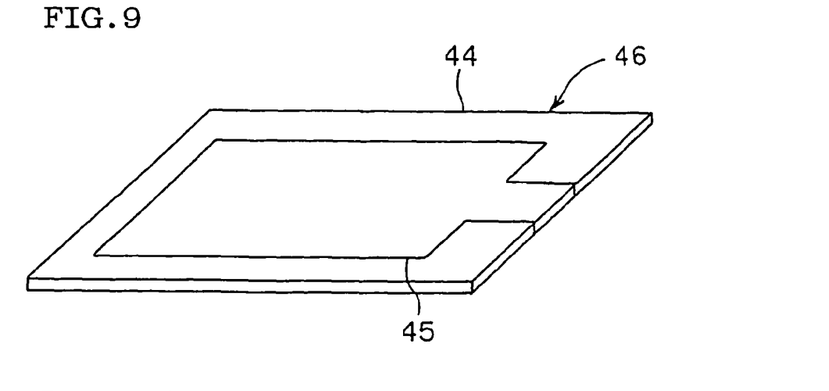
FIG. 9 is a perspective view schematically showing a conductive film-containing ceramic body constituting one embodiment of the plasma generating electrode of the present invention.

A sheet having regular protrusions shown in FIG. 8 was produced by extrusion. The flat portion was formed so that the thickness after firing was 0.25 mm. The protrusions regularly arranged on the flat portion were formed so that height after firing was 0.75 mm, the width after firing was 0.5 mm, and the intervals after firing was 5 mm. The protrusions on each end were formed so that the width after firing was 5 mm. The extruded sheet was produced so that the total width after firing was 70 mm. As the raw material, 93% purity alumina was used. After the addition of 5% of methyl cellulose (extrusion agent), a surfactant, and water, the components were kneaded and extruded. The extruded sheet was cut in the longitudinal direction of the protrusion so that the width after firing was 60 mm, and prefired at 1100° C. in the ambient air to obtain a protrusion-disposed ceramic body having a shape shown in FIG. 8.

A plate-like ceramic body shown in FIG. 9 was obtained by using the same extrusion material. A sheet was extruded so that the thickness after firing was 0.25 mm and the width after firing was 70 mm. The extruded sheet was cut so that the width after firing was 60 mm, and calcined at 1100° C. in the ambient air to obtain a plate-like ceramic body shown in FIG. 9.

A conductive film was printed on one side to a thickness of 10 μm by using a screen printing method so that the size after firing was 58×60 mm. Five sheets in total of the protrusion-disposed ceramic bodies and the plate-like ceramic bodies on which the conductor film was printed were alternately layered to obtain an integral formed body. After printing the same conductive film on both sides, the resulting product was fired in an $N_2$—$H_2$ reducing atmosphere. A five-stage integrally layered electrode unit (plasma generating electrode) was obtained. Seven five-stage units were stacked and fixed by using a metal frame, held at the outer circumference by using a thermoresistant mat, and placed in a cylindrical container made of SUS430 to obtain a plasma reactor.

A pulse power source using a thyristor element was connected with the plasma reactor, and discharge performance was evaluated. Uniform barrier discharge was obtained in all the stages by injecting 80 mJ/pulsed energy at 8 kV and 2 kpps. Soot was caused to flow through the plasma reactor in an amount of 2 g/h at 250° C. As a result, 60% of the soot was oxidized and purified. Exhaust gas model gas containing 200 ppm of NO was caused to flow through the plasma reactor at 200° C. The amount of NO in the bottom stage of the reactor was 60 ppm.

INDUSTRIAL APPLICABILITY

The plasma generating electrode and the plasma generation device of the present invention can be utilized to remove toxic components such as $NO_x$, carbon particulate, HC, and CO contained in engine exhaust gas or various kinds of incinerator exhaust gas and to purify the exhaust gas discharged to the outside. Moreover, since the plasma generating electrode and the plasma reactor can generate uniform and stable plasma, toxic components contained in exhaust gas can efficiently be removed. Since the plasma generating electrode and the plasma reactor exhibit excellent heat resistance, the plasma generating electrode and the plasma reactor can be used at high temperature for a long time.

The invention claimed is:

1. A plasma generating electrode comprising:
at least a pair of unit electrodes disposed at a predetermined interval and capable of generating the plasma,
each of the pair of unit electrodes including a plate-shaped ceramic body as a dielectric and a conductive film disposed inside the ceramic body and including a plurality of protrusions having a predetermined thickness and arranged in a predetermined pattern on one surface,
a plurality of conductive film through-holes formed on the conductive film,
the pair of unit electrodes (upper unit electrode and lower unit electrode) constituting one basic unit by being hierarchically layered at intervals corresponding to thickness of the protrusion in a state that a plurality of spaces which are open on each end in an arrangement direction of the protrusion are formed by a front surface of one unit electrode (lower unit electrode) of the pair of unit electrodes, surfaces of the protrusions disposed on the front surface, and a back surface of the other unit electrode (upper unit electrode),
the basic units being hierarchically layered at intervals corresponding to the thickness of the protrusion and constituting an electrode unit in which the unit electrodes and the spaces are three-dimensionally arranged, and
the plasma generating electrode being capable of generating the plasma in the three-dimensionally arranged spaces upon application of voltage between the unit electrodes constituting the electrode unit.

2. The plasma generating electrode according to claim 1, wherein, in a state that, on a front surface side of the basic unit having a shape in which a margin is added to an external shape of the unit electrode, a plate-shaped protrusion formation frame having almost the same external shape as an external shape of the basic unit, having the same thickness as the thickness of the protrusion, and having a plurality of through-holes whose one side parallel to the arrangement direction of the protrusion is equal to or longer than a length of the protrusion and whose one side perpendicular to the arrangement direction of the protrusion is the same as the arrangement interval between the protrusions is disposed, the unit electrodes and the spaces which are open on each end in the arrangement direction of the protrusion are formed by cutting the basic unit and the protrusion formation frame at positions corresponding to the ends of the spaces along a plane almost perpendicular to the front surface of the basic unit.

3. The plasma generating electrode according to claim 1, wherein the basic unit includes a first conduction through-hole and a second conduction through-hole which are formed through the basic unit in a vertical direction from regions on its top surface other than an arrangement region of the protrusions in a state that the first conduction through-hole and the second conduction through-hole are in contact with at least a part of one of the conductive films disposed in the upper unit electrode and the lower unit electrode, and electrical conduction can occur from the top surface to a bottom surface of the basic unit through the first conduction through-hole, the second conduction through-hole, and the conductive film.

4. The plasma generating electrode according to claim 3, wherein the basic unit includes conductive films (first through-hole conductive film and second through-hole conductive film) disposed on inner walls of the first conduction through-hole and the second conduction through-hole, and electrical conduction can occur from the top surface to the bottom surface of the basic unit by allowing the first through-hole conductive film and the second through-hole conductive film to be in contact with the conductive films disposed in the upper unit electrode and the lower unit electrode.

5. The plasma generating electrode according to claim 1, wherein the conductive films disposed in the upper unit electrode and the lower unit electrode constituting the basic unit extend to both ends of the basic unit in a direction perpendicular to the arrangement direction of the protrusion, the basic unit includes conductive films (first end face conductive film and second end face conductive film) disposed on end faces on the both ends, and electrical conduction can occur from the top surface to the bottom surface of the basic unit by allowing the first end face conductive film and the second end face conductive film to be in contact with the conductive films disposed in the upper unit electrode and the lower unit electrode.

6. The plasma generating electrode according to claim 1, wherein an opening percentage is 20% or more.

7. The plasma generating electrode according to claim 1, wherein the thickness of the unit electrode is 0.1 to 5 times the interval corresponding to the thickness of the protrusion.

8. The plasma generating electrode according to claim 1, wherein a width of the protrusion is 0.1 to 5 times the interval corresponding to the thickness of the protrusion.

9. The plasma generating electrode according to claim 1, wherein a distance between adjacent protrusions is 0.2 to 20 times the interval corresponding to the thickness of the protrusion.

10. A plasma reactor comprising the plasma generating electrode according to claim 1, wherein, when gas containing predetermined components is introduced into the spaces three-dimensionally arranged between the unit electrodes constituting the plasma generating electrode (electrode unit), the plasma reactor is capable of causing the predetermined components in the gas to be reacted by plasma generated in the spaces.

11. The plasma generating electrode according to claim 1, wherein a diameter of the conductive film through-hole is 0.5 to 10 mm.

12. The plasma generating electrode according to claim 1, wherein a length of outer periphery of the conductive film through-hole is 0.05 to 1.7 mm per 1 $mm^2$.

13. The plasma generating electrode according to claim 1, wherein an area of the conductive film having the conductive film through-hole is 0.1 to 0.98 $mm^2$ per 1 $mm^2$.

* * * * *